2 Sheets—Sheet 1.

J. SMITH & C. R. MESSINGER.

DISTRIBUTING LIQUIDS THROUGH TOBACCO.

No. 7,195. Reissued June 27, 1876.

Attest:
H. L. Perrine
Ewell A. Sick.

Inventors.
Jonathan Smith &
Chas R. Messinger
by Pollok & Bailey
Attorneys.

2 Sheets—Sheet 2.

J. SMITH & C. R. MESSINGER.

DISTRIBUTING LIQUIDS THROUGH TOBACCO.

No. 7,195. Reissued June 27, 1876.

Attest:
H. L. Perrine
Ewell A. Sick

Inventors.
Jonathan Smith
& Chas. R. Messinger
by Pollok & Bailey
Attorneys.

UNITED STATES PATENT OFFICE

JONATHAN SMITH AND CHARLES R. MESSINGER, OF TOLEDO, OHIO.

IMPROVEMENT IN DISTRIBUTING LIQUIDS THROUGH TOBACCO.

Specification forming part of Letters Patent No. 172,666, dated January 25, 1876; reissue No. 7,195, dated June 27, 1876; application filed June 14, 1876.

*To all whom it may concern:*

Be it known that we, JONATHAN SMITH and CHARLES R. MESSINGER, of Toledo, Ohio, have invented certain new and useful Improvements in the Method of and Apparatus for Distributing Liquid Material through Fine-Cut Tobacco, of which the following is a specification:

It is our object to effect the even, thorough, and uniform distribution through fine-cut tobacco, whether chewing or smoking tobacco, of the liquid material with which it is customary to treat such manufactured tobacco—such, for instance, as glycerine or other liquid heretofore used to moisten, sweeten, or flavor the tobacco.

The apparatus we have devised is adapted for the distribution, through fine-cut tobacco, of any substances which it is desired to incorporate therewith, provided those substances are in the condition of a liquid.

We employ as the distributing agent compressed air, which acts to spray or vaporize the liquid material, and at the same time to distribute it evenly through the tobacco.

To enable others skilled in the art to understand and use our invention, we will now proceed to describe the manner in which the same is or may be carried into effect by reference to the accompanying drawing, that represents one form of apparatus adapted for our purposes.

Figure 3:
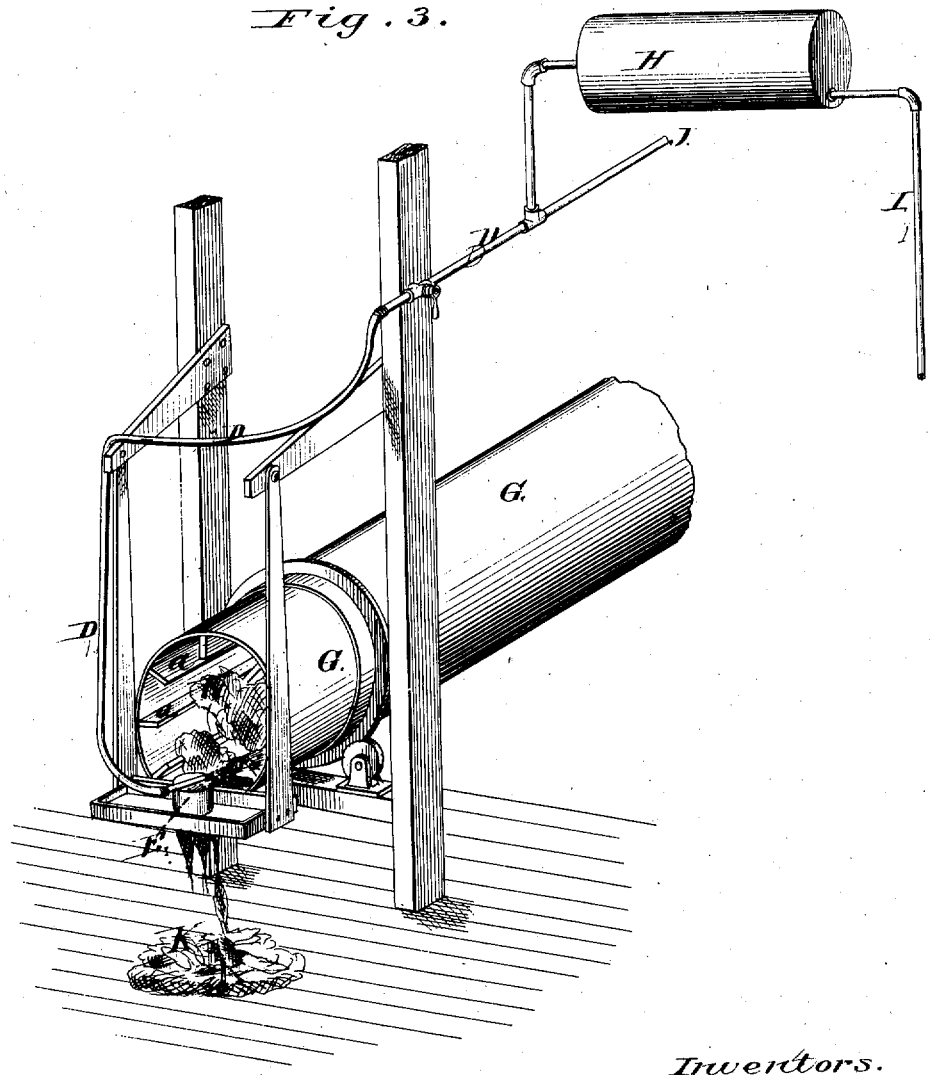

We make use of a sheet-metal cylinder, G, Fig. 3, of suitable size, which revolves on rollers or wheels, and has internal spiral flanges *a* extending the length of the cylinder. These flanges serve to carry the tobacco along through the cylinder, and also to lift and agitate the tobacco. In this way the "fine shorts" will be shaken out at or near the end of the cylinder, where they may be separated from the "long cut" by means of a wire cloth, of the proper mesh, which allows the finest shorts and dust to escape. The tobacco is fed in at one end of the cylinder, and is discharged at the other. At the end of the cylinder where the tobacco is discharged we have a vessel, E, filled with the liquid to be distributed.

Figure 1:
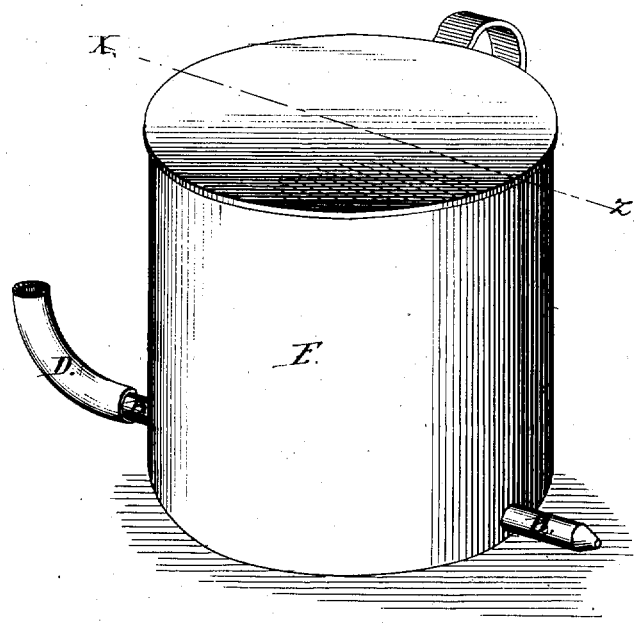
Figure 2:
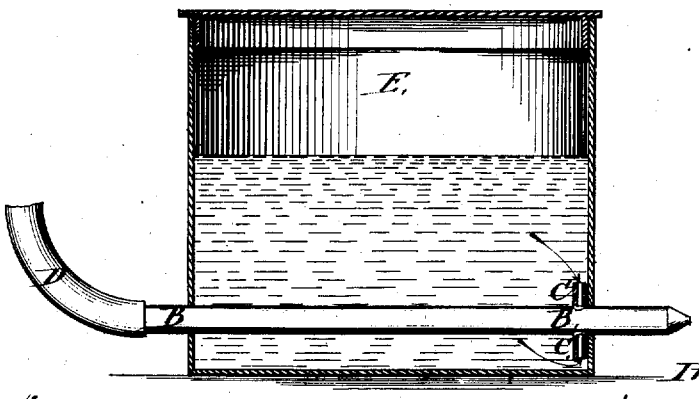

In order to distribute the liquid on the tobacco in such manner that it will not show or be in drops, we make use of highly-compressed dry air as a spraying or atomizing agent. To do this we may arrange the compressed-air nozzle over an aperture or nozzle leading to the liquid-containing vessel, in substantially the same way as nozzles for like purposes are arranged in the atomizers of daily use, for spraying perfumed waters and the like; or we may make use of an arrangement such as indicated in Figs. 1 and 2, in which E is the liquid-containing vessel; B, the compressed-air nozzle leading through the vessel; D, the pipe for conducting the supply of compressed air, and C small holes or teats, formed in the nozzle, and leading thereto from the liquid-containing vessel, and placed in such position, or at such an angle, that the air will take from them the proper amount of liquid, and blow it all through the tobacco in the condition of very fine mist, having the appearance of what is commonly called "dry steam."

To obtain compressed air we can make use of any good air-pump; but, whatever may be the compressing agent employed, we find it very desirable and important to have a cylinder or fountain, H, which will hold a large volume of compressed air, in order that the nozzle B may be supplied, through pipe D, with a steady jet of air, which must be even, uniform, and without pulsation.

This apparatus, while adapted to distribute all kinds of liquid material, is particularly adapted for the purpose of distributing liquids which are gummy, thick, or at all viscid. Such liquids—glycerine, for instance—require a heavy pressure of compressed air in order to be sprayed properly on the tobacco. Steam will not answer, no matter what pressure may be obtained, because it condenses; but spraying with compressed air distributes the liquid evenly, thoroughly, and uniformly, as before said, without reducing its consistency.

The spraying apparatus is placed opposite the discharge end of the cylinder in such position that the tobacco, as it reaches that end, will be properly sprayed and moistened.

The feed-cylinder, as it revolves, presents to the sprayer successive portions of tobacco, which, in turn, receive the sprayed liquid. The operation is thus rendered uniform, continuous, and not only effective but rapid.

We have described the form of apparatus that we prefer to use. The same, however, may be variously modified without departure from the principle of our invention.

What we claim, and desire to secure by Letters Patent, is—

1. The method of distributing liquid material through chewing or smoking tobacco by the employment of compressed air, substantially in the manner set forth.

2. The described combination of the compressed-air sprayer and the tobacco-feeder for presenting successive portions of the tobacco to the action of the sprayer, substantially as set forth.

In testimony whereof we have hereunto signed our names this 7th day of June, A D. 1876.

JONA. SMITH.
CHAS. R. MESSINGER.

Witnesses:
GEO. R. JAQUES,
JAS. HAWTHORN.